United States Patent [19]
Hashizume

[11] Patent Number: 6,155,686
[45] Date of Patent: *Dec. 5, 2000

[54] PROJECTION DISPLAY DEVICE

[75] Inventor: Toshiaki Hashizume, Okaya, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/137,752

[22] Filed: Aug. 21, 1998

[30] Foreign Application Priority Data

Aug. 21, 1997 [JP] Japan ................................. 9-225431

[51] Int. Cl.[7] ................................................ G03B 21/14
[52] U.S. Cl. ........................................... 353/38; 353/31
[58] Field of Search .................................. 353/101, 102, 353/69, 70, 31, 34, 37, 38; 349/5, 7, 8; 362/280, 323

[56] References Cited

U.S. PATENT DOCUMENTS

| | | | |
|---|---|---|---|
| 4,436,393 | 3/1984 | Vanderwerf | 353/102 |
| 4,936,657 | 6/1990 | Tejima et al. | 353/102 |
| 5,098,184 | 3/1992 | Van Den Brandt et al. | 353/102 |
| 5,283,599 | 2/1994 | Tejima et al. | 353/101 |
| 5,355,188 | 10/1994 | Biles et al. | 353/101 |
| 5,865,521 | 2/1999 | Hashizume et al. | 353/101 |

FOREIGN PATENT DOCUMENTS

| | | |
|---|---|---|
| 5-5963 | 1/1993 | Japan. |
| 7-27997 | 1/1995 | Japan. |

*Primary Examiner*—William Dowling
*Attorney, Agent, or Firm*—Oliff & Berridge, PLC

[57] ABSTRACT

To provide a projection display device which can easily produce a high contrast, bright projection image, without obliquely mounting the light source. In a projection display device, a condenser lens is disposed such that its optical axis is disposed at a location parallel to an optical axis of a light source by moving the optical axis of the condenser lens with respect to the optical axis L of the light source in substantially the same direction that an optical axis of a projection lens 60 is moved with respect to the optical axis of the light source. Therefore, light can obliquely illuminate a liquid crystal light valve, and can be efficiently guided to the projection lens. Consequently, a high contrast, bright projection image can be easily provided.

25 Claims, 6 Drawing Sheets

PROJECTION DISPLAY DEVICE

BACKGROUND OF THE INVENTION

1. Field of Invention

The present invention relates to a projection display device in which a light valve, employing, for example, a liquid crystal panel, modulates a light beam from a light source in order to enlarge and project the modulated light beam onto a light projecting surface through a projection lens.

2. Description of Related Art

A projection display device forms modulated light beams in correspondence with image information using liquid crystal light valves in order to enlarge and project the modulated light beams onto, for example, a screen through a projection lens. This type of projection display device is known to produce a high contrast projection image by obliquely illuminating light onto liquid crystal valves which are incident light angle dependent.

A projection display device with a structure in which light obliquely illuminates from a liquid crystal light valve is disclosed in, for example, Japanese Unexamined Patent Publication No. 7-27997. In FIG. 8, the projection display device 1A disclosed in the aforementioned publication comprises a liquid crystal light valve 100A for modulating light emitted from a light source 80A, a projection lens 60A for enlarging and projecting the light modulated by the liquid crystal light valve 100A onto a screen 1000, and a condenser lens 960A disposed adjacent to the light incident surface of the liquid crystal light valve 100A.

In the projection display device 1A, the liquid crystal light valve 100A, the condenser lens 960A, and the projection lens 60A are arranged such that their optical axes 100L, 960L, and 60L are parallel to each other. The light source 80A is mounted such that its optical axis 80L is set obliquely at a predetermined angle from the optical axes 100L, 960L, and 60L of the aforementioned optical elements.

In the projection display device 1A disclosed in Japanese Unexamined Patent Publication No. 7-27997, however, it is necessary to adjust the mounting angle of the light source 80A, which is troublesome to perform. In addition, it is difficult to mount all of the optical elements with high precision, since the condenser lens 960A, the liquid crystal light valve 100A, and the projection lens 60A, must be moved along the optical axis 80L of the light source such that their optical axes 960L, 100L, and 60L are set parallel to each other.

SUMMARY OF THE INVENTION

Accordingly, it is an object of the present invention to provide a projection display which can easily produce a bright and high contrast projection image, without obliquely mounting the light source.

To this end, according to the present invention, there is provided a projection display device comprising a light valve for modulating light beams from a light source; a projection lens for enlarging and projecting the light beams modulated by the light valve onto a projecting screen; and a condenser lens disposed at a light incident surface side of the light valve. The projection lens is disposed such that an optical axis of the projection lens occupies a location parallel to an optical axis of the light source. The parallel optical axes are realized by moving the optical axis of the projection lens by a predetermined distance in a direction perpendicular to the optical axis of the light source. The condenser lens is also disposed such that an optical axis of the condenser lens occupies a location parallel to the optical axis of the light source. The parallel optical axes are realized by moving the optical axis of the condenser lens in substantially the same direction that the optical axis of the projection lens is moved with respect to the optical axis of the light source.

According to the projection display device of the present invention, light, traveling along the optical axis of the light source, enters the condenser lens, which converts the light in such a manner that it causes it to leave with a center optical axis extending in a direction slightly inclined from the optical axis of the light source. Therefore, it is possible to obliquely illuminate the light valve, and increase the amount of light guided to the projection lens which is displaced from the optical axis of the light source, without obliquely mounting the light source. Consequently, a bright and high contrast projection image can be easily produced.

In addition, according to the projection display device of the present invention, an optical system can be easily formed for producing a high contrast, bright projection image, since the condenser lens is mounted such that its optical axis occupies a location parallel to the optical axis of the light source. The parallel optical axes are realized by moving the optical axis of the condenser lens by a predetermined distance in a direction perpendicular to the optical axis of the light source, instead of obliquely disposing the light source. Thus, when the center optical axis of the light leaving the condenser lens passes approximately through the center of the entrance pupil of the projection lens, light from the condenser lens can be guided very efficiently to the projection lens.

In order to uniformly illuminate a light valve for producing a high quality projection image without any color irregularities and nonuniform illumination, it is desirable to provide a uniform illumination optical system in the optical path between the light source and the condenser lens in order to divide light beams from the light source into a plurality of partial light beams and superimpose them upon their respective light valves.

In the above-described projection display device, when a direction of extension of the center optical axis of the light emitted from the condenser lens and the direction of light passing through the light valve substantially match, a particularly high contrast image can be produced.

When the light valve of the above-described projection display device includes a plurality of pixels disposed in a matrix arrangement and a microlens array having a plurality of microlenses for gathering light incident upon the pixels, the light gathered by the microlenses can be efficiently guided to the pixels of the light valve by setting the centers of the pixels at locations achieved by moving them with respect to the optical axes of the microlenses in substantially the same direction that the optical axis of the condenser lens is moved with respect to the optical axis of the light source. Therefore, a high contrast, bright projection image can be produced.

The structure of the present invention may be applied to a projection display device of the type which separates light beams from the light source into light beams of a plurality of colors, modulates the light beams of different colors through the use of light valves, recombines the modulated light beams of different colors, and enlarges and projects the combined modulated light beams onto a light projecting surface through the projection lens.

More specifically, there is provided a projection display device further comprising a color separator that separates the light beams from the light source into light beams of a plurality of different colors; a color combiner that combines the light beams of the plurality of different colors modulated by the light valves corresponding thereto. A plurality of the light valves are provided for modulating the light beams of the plurality of different colors obtained by the color separator. The projection lens enlarges and projects the light beams combined by the color combiner onto a projection surface. The condenser lens is disposed at the light incident surface side of each of the light valves, and the optical distances from each of the condenser lenses to the projection lens are substantially equal.

According to the above-described projection display device, the light source does not have to be obliquely mounted in order to produce a high contrast, bright projection image, so that the optical system can be easily constructed.

In particular, in a projection display device comprising a color separator that separates light beams from the light source into light beams of three different colors and color combiner that combines the light beams of three different colors modulated by their corresponding light valves, when the color separator includes two dichroic mirrors, and the color combiner has a dichroic prism in which a dichroic layer is formed along a face where four right angled prism portions are affixed together and in the shape of an X, it is not possible to make the distances from the light source to the light valves for all of the colors equal. In this case, even when the light source is obliquely mounted, as shown in FIG. 8, the distances from the light to the projection lens for each of the colors differ, so that it is not possible to efficiently guide all of the different colors to the projection lens. In the present invention, however, the optical axis of the condenser lens, disposed at the light incident surface side of each light valve, is moved to a parallel location, so that the optical distances from each of the condenser lenses to the projection lens are substantially equal. Therefore, even though the distances from the light source to each of the light valves differ, a high contrast, bright projection image can be obtained.

DETAILED DESCRIPTION OF PREFERRED EMBODIMENTS

A description will now be given of a projection display device to which the present invention is applied, with reference to the drawings. In the description of the optical system, for the sake of convenience, three directions that are perpendicular to each other are represented by arrows X, Y, and Z, with the arrow Z representing the direction of travel of light. In the projection display device of the present embodiment, white light, emitted from a light source lamp unit, is separated into light beams of three colors, a red light beam, a green light beam, and a blue light beam. The three color light beams are modulated by respective liquid crystal light valves, in correspondence with image information, after which the three modulated color light beams are recombined into a single light beam, which is enlarged and projected onto a screen through a projection lens.

Figure 1:
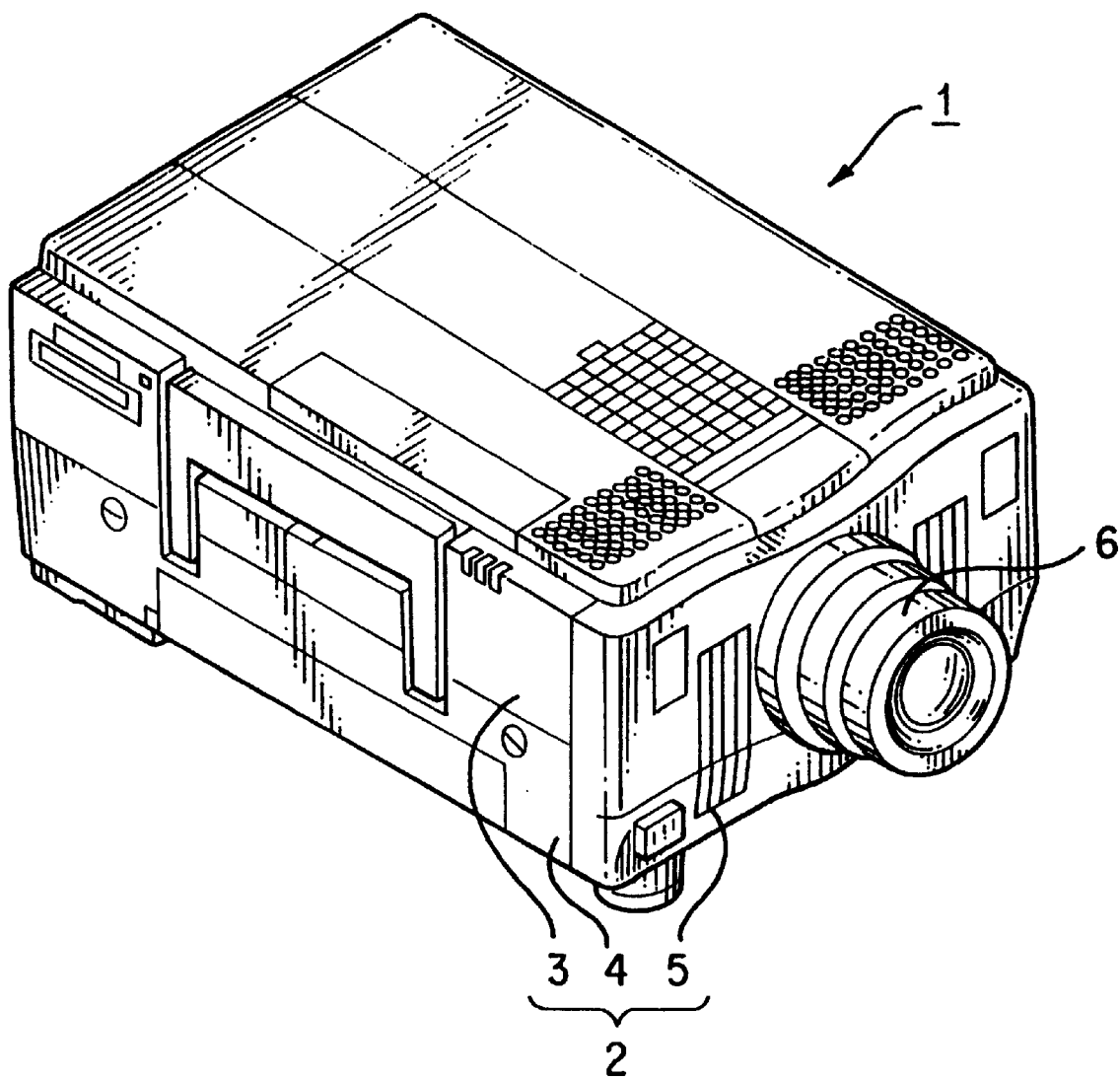
FIG. 1 is a perspective view of the appearance of the projection display device to which the present invention is applied.

FIG. 1 is a view showing the appearance of the projection display device of the present embodiment. In the figure, a projection display 1 comprises a rectangular outside case 2 that basically includes an upper case 3, a lower case 4, and a front case 5 which defines the front face of the projection display device 1. An end of a projection lens unit 6 protrudes from the center of the front case 5.

Figure 2:
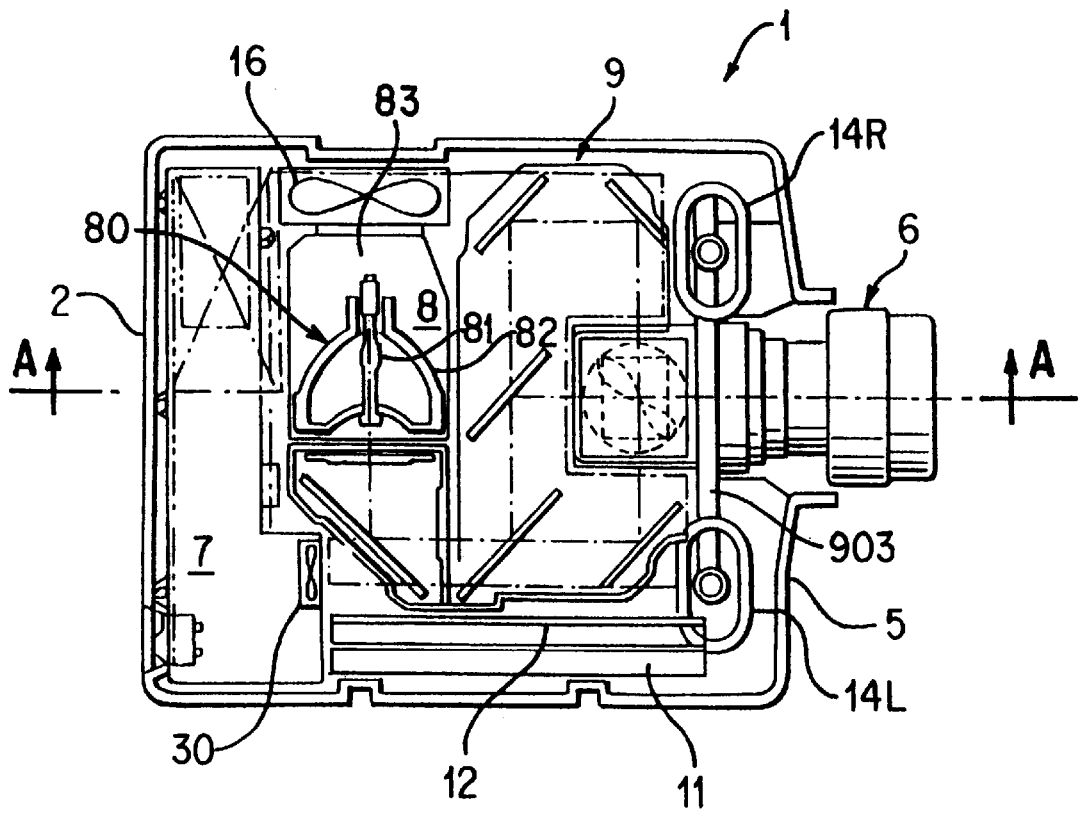
FIG. 2 is a plan view showing the internal structure of the projection display device of FIG. 1.
Figure 3:
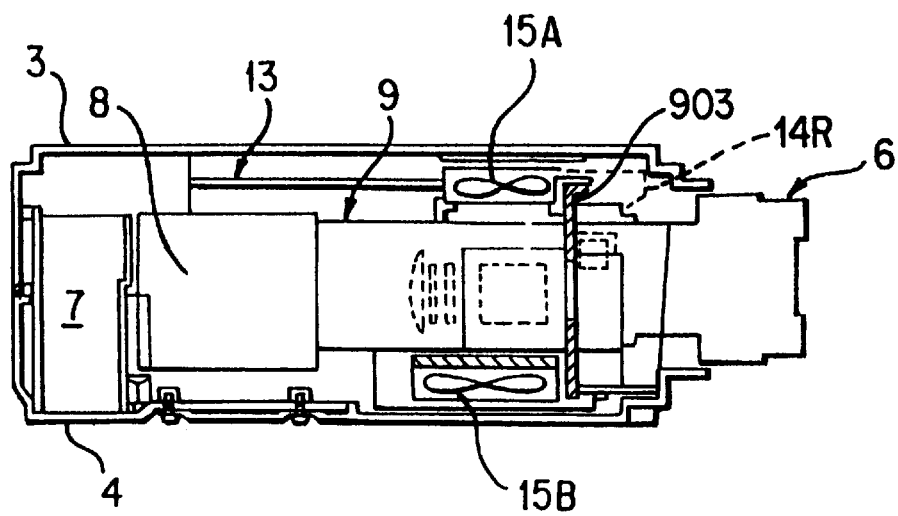
FIG. 3 is a sectional view showing the structure taken along line A—A of FIG. 2.

FIG. 2 is a view showing the arrangement of the structural parts within the outside case 2 of the projection display device 1, while FIG. 3 is a sectional view taken along line A—A of FIG. 2. As shown in FIGS. 2 and 3, a power supply unit 7 is disposed at the rear end side of the interior of the outside case 2. A light source lamp unit 8 is disposed adjacent to the power supply unit 7 and is closer to the front side of the projection display 1 than the power supply unit 7. An optical unit 9 is disposed closer to the front side of the projection display device 1 than the light source lamp unit 8. A projection lens unit 6 is located at the center front side of the optical unit 9.

An interface substrate 11, with an input-output interface circuit, is formed along a side of the optical unit 9 so as to extend in the forward-and-backward directions of the projection display device 1. A video substrate 12, with a video signal processing circuit, is formed so as to extend parallel to the interface substrate 11. A control substrate 13 for controlling driving of the projection display device 1 is disposed at the upper side of the light source lamp unit 8 and the optical unit 9. Speakers 14R and 14L are disposed respectively at the right and left corners of the front end side of the projection display device 1.

A cooling suction fan ISA is disposed at the center portion of the upper surface side of the optical unit 9, while a circulating fan 15B for generating a cooling circulating current is disposed at the center portion of the bottom surface side of the optical unit 9. An exhaust fan 16 is disposed at a side of the projection display device 1, that is at the back side of the light source lamp unit 8. An auxiliary cooling fan 30 is disposed facing an end of each of the substrates 11 and 12, in the power supply unit 7, in order to suck cooling air currents flowing from the suction fan 15A into the power supply unit 7.

Figure 4:
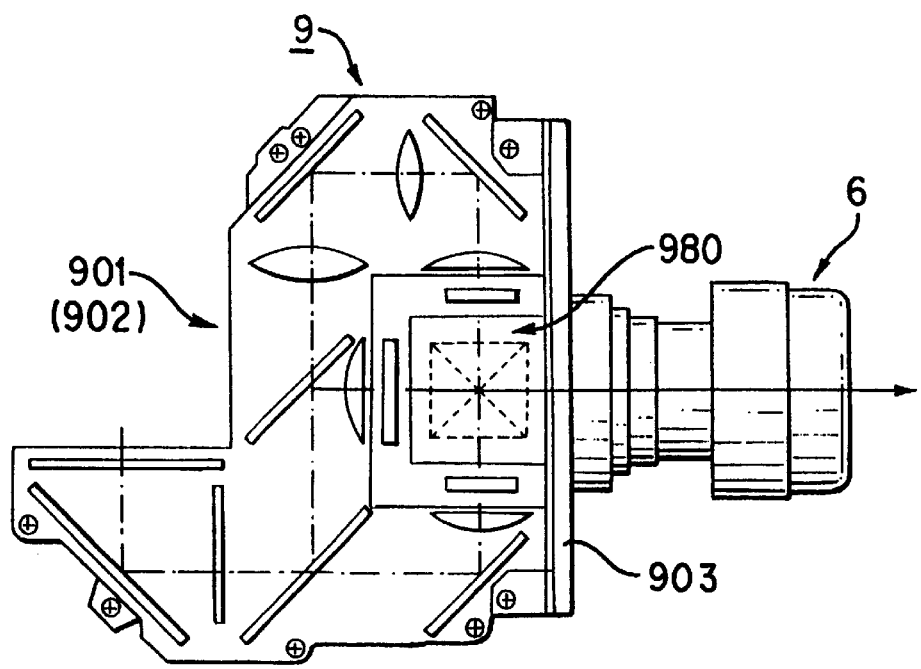
FIG. 4 is a plan view showing the structure of the optical unit and the projection lens unit of the projection display device.

FIG. 4 is a view of the optical unit 9 and the projection lens unit 6 of the projection display device 1. As shown in FIG. 4, in the optical unit 9, an optical element, other than a dichroic prism 980 is held into upper and lower light guides 901 and 902. The upper light guide 901 and the lower light guide 902 are secured, respectively, at the upper case 3 side and at the lower case 4 side with fixing screws. In addition, the upper and lower light guides 901 and 902 are similarly secured at the dichroic prism 980 side with fixing screws. The dichroic prism 980 is fixed, using a fixing screw, at the reverse side of a thick head plate 903 which comprises a die-cast plate. The projection lens unit 6 is similarly secured to the front face of the head plate 903 with a fixing screw.

Figure 5:
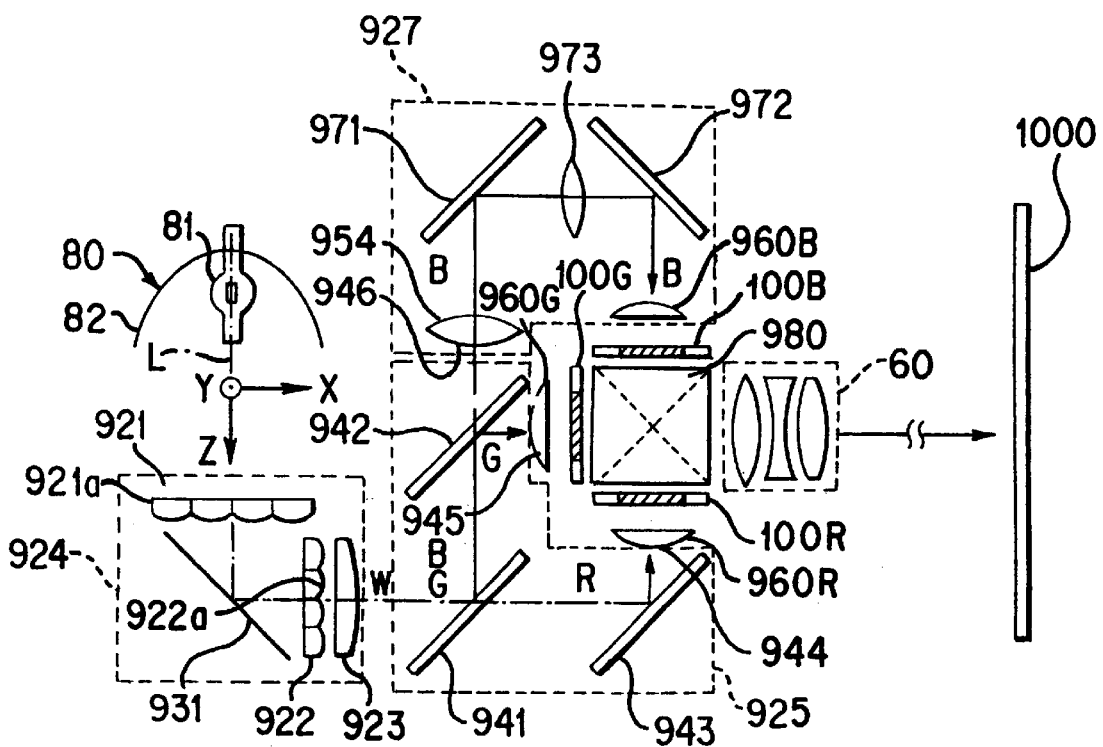
FIG. 5 is a structural view of the optical systems incorporated in the projection display device of FIG. 1.

FIG. 5 shows the structure of the optical systems incorporated in the projection display device 1 of the present embodiment. In the projection display device 1, there are employed a light source 80 (being a structural component of the light source lamp unit 8), and a uniform illumination optical system 924 including first and second lens plates 921 and 922, and a superposition lens 923. In addition, a color separating optical system 925 is used in order to separate white light W emitted from the uniform illumination optical system 924 into a red (R) light beam, a green (G) light beam, and a blue (B) light beam. The projection display device 1 also includes three liquid crystal light valves 100R, 100G, and 100B, which modulate R beams, G beams, and B beams, respectively; a dichroic prism 980 for combining the modulated color light beams; a projection lens 60 which is a structural element of the projection lens unit 6 and causes the combined beams to be enlarged and projected onto a screen 1000; and a light-guiding system 927 for guiding the blue light beam B of the color light beams to the corresponding liquid crystal light valve 100B.

The light source 80 of the light source lamp unit 8 includes a lamp body 80 and a reflector 82. The lamp may be a halogen lamp, a xenon lamp, a metal halide lamp, or the like. The reflector 82 has a reflecting surface which is parabolic in cross section. The light beams emitted from the lamp body 81 are reflected by the reflector 82, causing the light beams to travel almost parallel to each other towards the uniform illumination optical system 924.

The uniform illumination optical system 924 separates the light beams emitted from the light source lamp unit 8 into a plurality of partial light beams, and causes the separated light beams to be superimposed upon and virtually uniformly illuminate the light valves 100R, 100G, and 100B.

The first lens plate 921 has a plurality of rectangular lenses 921a which are placed in a matrix arrangement, and separate the light beams from the light source 80 into a plurality of partial light beams, which are gathered in the vicinity of the second lens plate 922.

The second lens plate 922 has a plurality of rectangular lenses 922a placed in a matrix arrangement, and is used to set the paths of the centers of the light beams emitted from the first lens plate 921 parallel to an optical axis L of the light source. When a light beam from the light source 80 travels parallel to the optical axis L of the light source, the paths of the centers of the partial light beams emitted from the first lens plate 921 are also parallel to the optical axis L of the light source. Therefore, when the degree of parallelism of the light beams from the light source 80 is high, the second lens plate 922 does not have to be used.

The uniform illumination optical system 924 of the present embodiment includes a reflecting mirror 931, which bends the optical axis L of the light source towards the front of the projection display device 1 and is placed between the first and second lens plates 921 and 922.

The superposition lens 923 is disposed at the light-emitting surface side of the second lens plate 922, and causes light beams to be superimposed upon the corresponding light valves 100R, 100G, and 100B.

Accordingly, in the projection display device 1 of the present embodiment, the uniform illumination optical system 924 causes light to virtually uniformly illuminate the liquid crystal light valves 100R, 100G, and 100B, so that a projection image with no illumination unevenness can be produced.

The color separating optical system 925 includes a blue-and-green light reflecting dichroic mirror 941, a green light reflecting dichroic mirror 942, and a reflecting mirror 943. Light beam W emitted from the uniform illumination optical system 924 first strikes the blue-and-green color reflecting dichroic mirror 941 which reflects the blue light beam B and the green light beam G of the light beam W virtually vertically, causing the reflected light beams B and G to go towards the green light reflecting dichroic mirror 942.

The red light beam R passes through the mirror 941, and is reflected almost vertically by the reflecting mirror 943 disposed behind the mirror 941. Then, the reflected red light beam R is emitted from a light emitting section 944 and is directed towards the dichroic prism 980. Of the blue and green light beams B and G reflected by the blue-and-green light reflecting dichroic mirror 941, only the green light beam G is reflected vertically by the green light reflecting dichroic mirror 942. The reflected green light beam G is emitted from a light emitting section 945 and is directed towards the dichroic prism 980. The blue light beam B, which has passed through the green light reflecting dichroic mirror 942, is emitted from a light emitting section 946 and is directed towards the light-guiding system 927. In the present embodiment, the distances of the light emitting sections 944, 945, and 946 of each of the color light beams in the color separating optical system 925 from the light emitting section of the light W in the uniform illumination optical system 924, are set virtually equal to each other.

Condenser lenses 960R and 960G are disposed respectively at the light emitting sides of the red light R and green light G emitting sections 944 and 945 in the color separating optical system 942. The red light beam R and the green light beam G, emitted from their respective light emitting sections, are converted into parallel beams as a result of entering their respective condenser lenses 960R and 960G.

The parallel red and green light beams R and G enter their respective liquid crystal valves 100R and 100G and are modulated thereby, as a result of which image information in correspondence with each color light is added. In other words, the liquid crystal light valves are controlled by switching operations by a driving unit (not shown) in accordance with the image information, whereby the color light beams which pass through the liquid crystal light valves are modulated. Any known device may be used for the driving unit. On the other hand, the blue light beam B is guided to its associated liquid crystal light valve 100B through the light-guiding system 927. At the light valve 100B, the blue light beam B is similarly modulated in accordance with the image information. The liquid crystal light valves of the present embodiment may be, for example, active matrix liquid crystal devices utilizing a polysilicon Thin-Film Transistor (TFT) as a switching clement and provided with polarizers on both sides thereof.

The light-guiding system 927 comprises condenser lens 954 disposed at the light emitting side of the blue light beam B emitting section 946; a light incident side reflecting mirror 971; a light emitting side reflecting mirror 972; an intermediate lens 973 disposed between the reflecting mirrors 971 and 972; and a condenser lens 960B disposed before the liquid crystal light valve 100B. The path of the blue light beam B is longest, that is, the liquid crystal panel for the blue light beam B is furthest from the light source 80 compared to other liquid crystal panels, so that the amount of loss of the blue light beam B is the greatest. However, the amount of loss can be reduced by the interposition of the light-guiding system 927.

The color light beams R, G, and B, which have passed through their respective liquid crystal light valves 100R, 100G, and 100B and modulated thereby, enter the dichroic prism 980 which recombines them. The dichroic prism 980 has a dichroic layer, which is formed along the face where four right-angled prism portions are joined together. The color images, combined by the dichroic prism 980 into a single image, are enlarged and projected onto the screen 1000 disposed at a predetermined location through the projection lens 60 of the projection lens unit 6. The projection lens 60 may be a telecentric lens.

Figure 6:
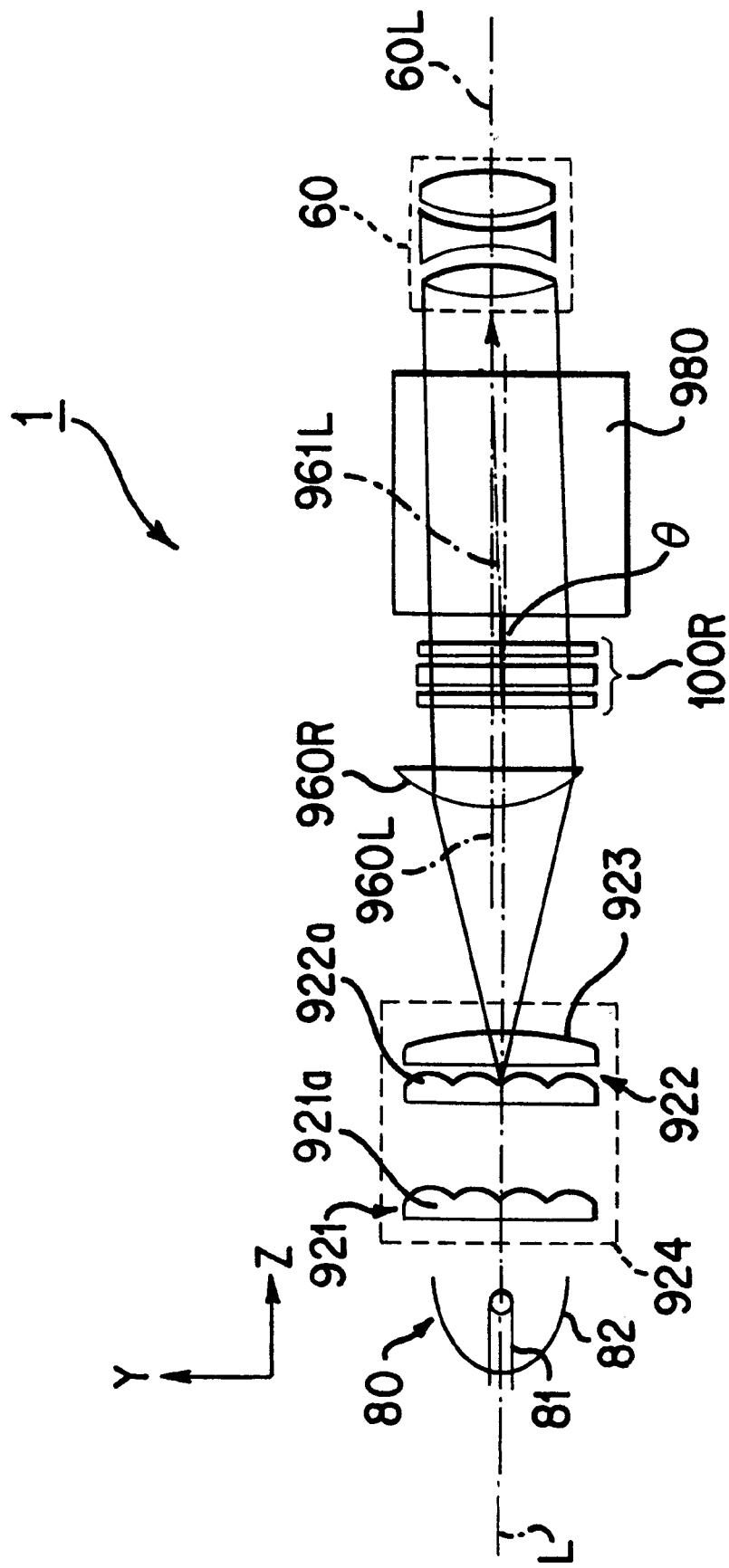
FIG. 6 is a view showing the positional relationship of the lenses along the optical axis of the light source.

A description will now be given of the positional relationship of the lenses of the optical systems incorporated in the projection display device 1 of the present embodiment. Each of the light paths extending from the light source 80 to their respective liquid crystal light valves 100R, 100G, and 100B is bent in order to make the optical systems compact. Optically speaking, however, these optical systems are equivalent to an optical system in which each of the lenses are arranged along the optical axis L of the light source 80 in straight lines. FIG. 6 is a view showing an equivalent optical system for a red light beam. It is to be noted that the color-separating optical system 925 formed between the uniform illumination optical system 924 and the condenser lens 960R is not shown.

The equivalent optical systems for the green light beam and the blue light beam are the same as the optical system for the red light beam, so that these optical systems will not be described below.

As shown in FIG. 6, in the projection display device 1 of the present embodiment, the projection lens 60 is positioned such that the optical axis 60L thereof occupies a location parallel to the optical axis L of the light source 80 reached by moving the optical axis 60L a certain distance from and in a direction perpendicular to the optical axis L of the light source 80, or in direction Y in the present embodiment. On the other hand, the condenser lens 960R is positioned such that the optical axis 960L thereof occupies a location parallel to the optical axis L of the light source 80 by moving the optical axis 960L in the same direction that the optical axis 60L of the projection lens 60 is moved with respect to the optical axis L of the light source 80, or in direction Y in the present embodiment.

Accordingly, when light enters the condenser lens 960R, the condenser lens 960R converts the incident light beam into a substantially parallel light beam with a center optical axis 961L extending in a direction which is inclined by a predetermined angle θ from the optical axis L of the light source 80. The substantially parallel light beam is emitted from the condenser lens 960R. In the present embodiment, the center optical axis 961L of the light beam emitted from the condenser lens 960R is set so as to approximately pass through the entrance pupil of the projection lens 60.

Accordingly, since the condenser lens 960R is positioned such that the optical axis 960L occupies a location parallel to the optical axis L of the light source 80 by moving the optical axis 960L a certain distance from and in a direction perpendicular to the optical axis L of the light source 80, a light beam travelling from the condenser lens 960R towards the liquid crystal light valve 100R is inclined by a predetermined angle θ from the optical axis L of the light source 80, so that the light source 80 does not have to be obliquely mounted. Accordingly, the light obliquely illuminates the liquid crystal light valve 100R. Since the light beam is emitted from the condenser lens 960R at an angle, and the center optical axis 961L of the light beam emitted from the condenser lens 960R intersects at about the center of the entrance pupil of the projection lens 60, the light beam, modulated by the liquid crystal light valve 100R, can be efficiently guided towards the projection lens 60.

More specifically, when the optical axis 960L of the condenser lens 960R coincides with the optical axis L of the light source 80, part of the light beam from the liquid crystal valve 100R does not fall upon the projection lens 60, so as to reduce efficiency. In contrast, in the projection display device 1 of the present embodiment, the light beam from the condenser lens 960R is made to travel obliquely by positioning the optical axis 960L of the condenser lens 960R at a location parallel to the optical axis L of the light source 80 by moving the optical axis 960L perpendicular to the optical axis L of the light source, so that the light beam, modulated by the liquid crystal light valve 100R, can reliably impinge upon the projection lens 60.

Accordingly, in the projection display device 1 of the present embodiment, the light beams, modulated by the liquid crystal light valves 100R, 100G, and 100B, can be efficiently guided to the projection lens 60, not by obliquely mounting the light source 80 at a predetermined angle θ from the optical axis of such optical elements as a liquid crystal light valve or a projection lens, but by simply placing the optical axis 960L of the condenser lens 960R, disposed at the light incident surface sides of the liquid crystal light valves 100R, 100G, and 100B, at a location parallel to the optical axis L of the light source by moving the optical axis 960L substantially in the same direction that the optical axis 60L of the projection 60 is moved with respect to the optical axis L of the light source 80. In other words, light beams can be made to illuminate their respective liquid crystal light valves 100R, 100G, and 100B at an angle, not by the conventional method of arranging the optical elements in a complicated way, but by using a simpler method that allows light beams to obliquely illuminate the liquid crystal light valves 100R, 100G, and 100B in order to provide a projection image with high contrast and a bright projection image obtained by increasing the amount of light entering the projection lens 60. In addition, the center optical axis 961L of the light beams from the condenser lenses 960R, 960G, and 960B approximately passes through the center of the entrance pupil of the projection lens 60L, making it possible to guide light to the projection lens 60 with greater efficiency and to provide a brighter projection image. In the projection display device 1 of the present embodiment, when center optical axis 961L of the light beams from the condenser lenses 960R, 960G, and 960B is virtually set in the direction that light passes through (or the distinct visual direction) the liquid crystal light valves 100R, 100G and 100B an image with a very high contrast can be produced.

Figure 8:
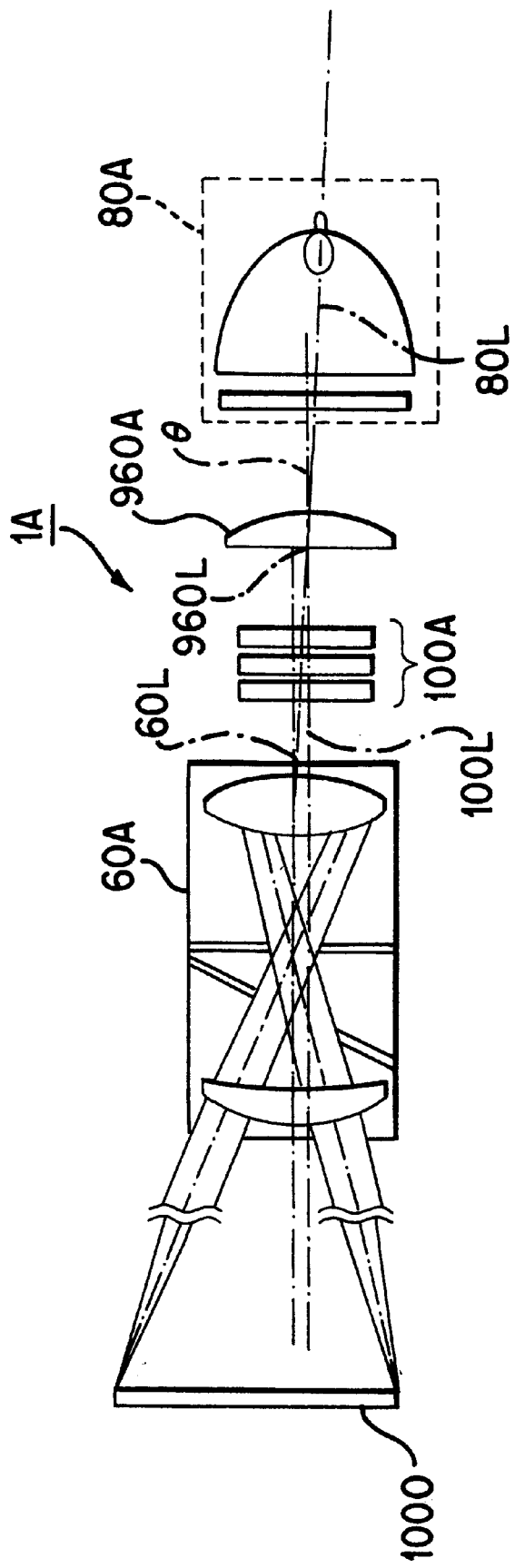
FIG. 8 is a view showing the positional relationship of the lenses along the optical axis of a conventional light source.

In the projection display device 1 of the present embodiment, light from the light source 80 is separated into light beams of three different colors by the color separating optical system 925, and the three separated color light beams are modulated by their respective liquid crystal light valves 100R, 100G, and 100B, after which the modulated color light beams are combined by the dichroic prism 980. Accordingly, the distances from the light source 80 to each of the liquid crystal light valves 100R, 100G, and 100B differ. In this case, even when the light source 80 is obliquely mounted, as shown in FIG. 8, the distance from the light source to the projection lens cannot be made the same for each color, making it impossible to efficiently guide all of the different colors to the projection lens. In the projection display device 1 of the present embodiment, however, it is possible to make the optical distances from each of the condenser lenses 960R, 960G, and 960B to the projection lens 60 equal, by moving the optical axes of the condenser lenses 960R, 960G, and 960B, disposed at the light incident surface sides of the liquid crystal light valves 100R, 100G, and 100B, to locations parallel to the optical axis. Therefore, a bright projection image with high contrast can be produced, even through the distances from the light source 80 to the liquid crystal light valves 100R, 100G, and 100B differ.

A description will now be given of a second embodiment of the projection display device in accordance with the present invention. The projection display device of the present embodiment is essentially the same as the aforementioned projection display device 1 regarding the relative positions of each of the optical elements (such as the condenser lenses 960R, 960G, and 960B, and the projection lens 60). It differs from the aforementioned projection display device 1 in that liquid crystal light valves with microlens arrays are used. Therefore, in FIG. 7, only the liquid crystal light valves and the condenser lenses of the projection display device of the second embodiment are shown, with corresponding parts to those of the aforementioned projection display device 1 given the same reference numerals.

Figure 7:
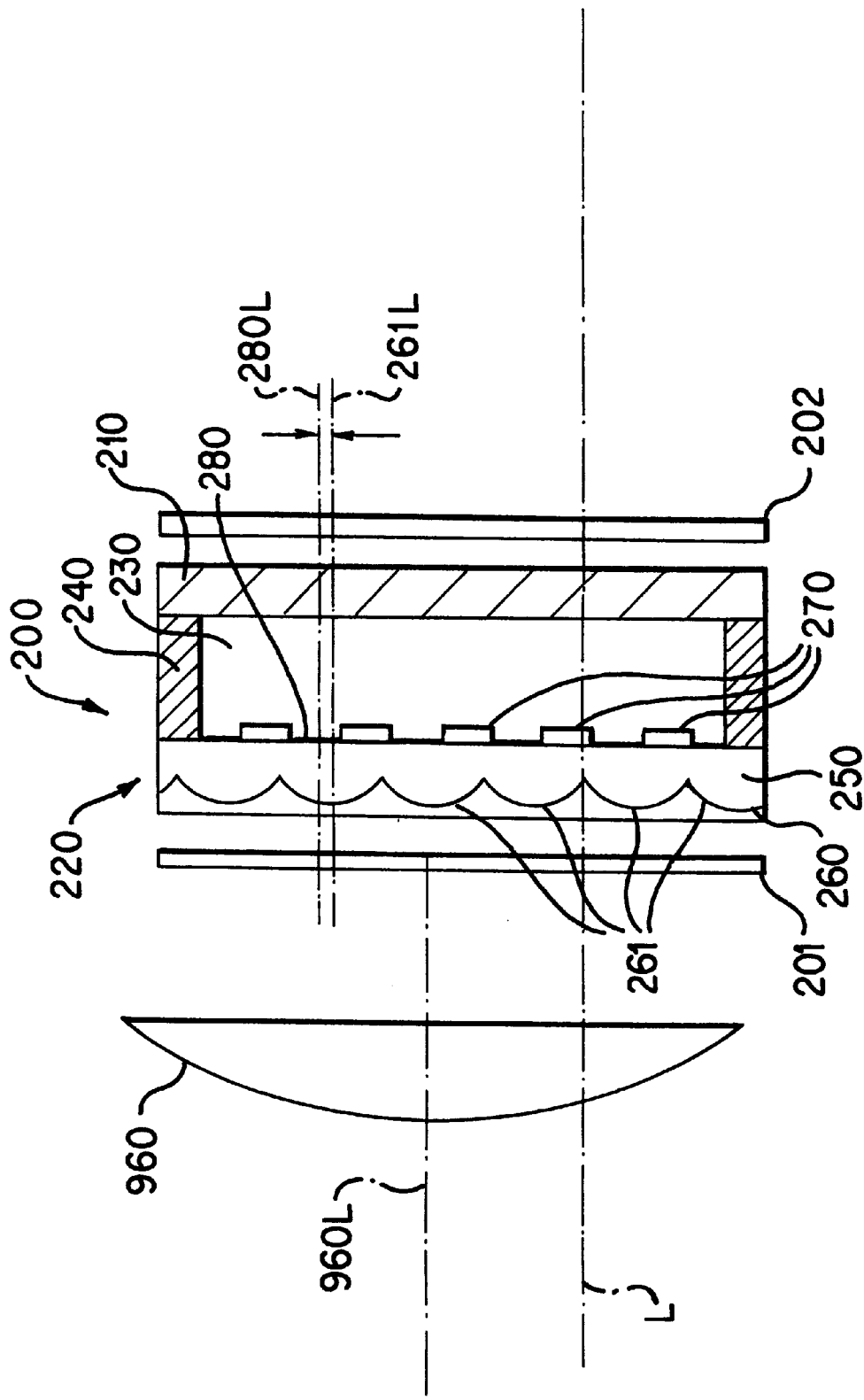
FIG. 7 is a structural view of the periphery of the liquid crystal light valve in a projection display device employing a liquid crystal valve with microlenses.

As shown in FIG. 7, the structure of the liquid crystal light valve 200 includes a liquid crystal element consisting of a first substrate 210 and an opposing second substrate 220, and a liquid crystal layer 230 filled between the substrates 210 and 220. The first substrate 210 and the second substrate 220 are glass substrates, made of quartz glass or the like and placed between a pair of polarizers 201 and 202. A sealant 240 is provided between the first substrate 210 and the second substrate 220.

An alignment layer, a pixel electrode, a switching element, a bus wiring, and the like, all of which are not shown, are formed on the first substrate 210. A polysilicon thin film transistor (TFT), for example, may be used for the switching element. A microlens substrate 250, composed of crystallized glass made of, for example, quartz or neoserum, is formed at the light emitting surface side of the second substrate 220. A microlens array 260 is integrally formed at the light incident surface side of the microlens substrate 250. The microlens array 260 has a plurality of microlenses 261. The microlenses 261 are convex lenses, which are placed in a matrix arrangement in correspondence with the pixels of the liquid crystal element.

The light emitting surface of the microlens substrate 250 is a flat surface which has a black matrix 270 (made of metallic chrome or the like) formed thereon by vapor deposition, or the like, in order to prevent light from illuminating the switching element formed on the first substrate 210.

In the liquid crystal light valve 200 of the present embodiment, the pixel openings 280 and the microlenses 261 are disposed relative to each other, such that each of the pixel centers 280L are at locations achieved by moving the centers of the pixel openings 280, that is pixel centers 280L, with respect to an optical axis 261L of the microlens 261 in substantially the same direction that the optical axis 960L of the condenser lens 960 is moved with respect to the optical axis L of the light source 80. In other words, the pixel openings 280 and the microlenses 261 are disposed relative to each other such that almost all of the light obliquely incident on the microlenses 261 is guided to the pixel openings 280.

As in the above-described projection display device 100, the condenser lens 960 of the projection display device provided with the liquid crystal light valve 200 is positioned such that the optical axis 960L thereof occupies a location parallel to the optical axis L of the light source 80 reached by moving the optical axis 960L a predetermined distance from and in a direction perpendicular to the optical axis L of the light source 80. Therefore, a light beam traveling from the condenser lens 960 illuminates the liquid crystal light valve 200 obliquely at a predetermined angle θ from the optical axis L of the light source. As a result, instead of the conventional method in which the arrangement of the optical elements are complicated, a simple method can be used to obliquely illuminate the liquid crystal light valve to produce a projection image with high contrast. In addition, a bright projection image can be produced by increasing the amount of light entering the projection lens 60.

In addition, in the present embodiment, the centers 280L of pixel openings 280 occupy locations achieved by moving them with respect to the optical axis 261L of the microlens 261 in substantially the same direction that the optical axis 960L of the condenser lens 960 is moved with respect to the optical axis L of the light source 80. Therefore, when a light beam obliquely illuminates the liquid crystal light valve 200 at a predetermined angle θ from the optical axis L of the light source, the microlenses 261 cause the light beam to be guided into the pixel openings 280 with even greater efficiency. As a result, a brighter projection image with a much higher contrast can be produced.

In the condenser lenses 960R, 960G, and 960B of the above-described embodiments, the geometric centers and the optical centers coincide and their optical axes occupy locations parallel to the optical axis L of the light source 80 by moving the optical axes in substantially the same direction that the optical axis L of the light source 80 is moved with respect to the projection lens 60. In other embodiments, a decentered lens whose geometric center and optical center do not coincide may be used. When decentered lenses are used for the condenser lenses 960R, 960G, and 960B, they are disposed such that their optical axes occupy locations parallel to the optical axis L of the light source 80 by moving the condenser lens optical axes in substantially the same direction that the projection lens 60 is moved with respect to the optical axis L of the light source 80.

The above-described projection display devices are all front type projection display devices in which light is projected from the side from which the light projecting surface is observed, but the projection display device of the present invention may be a rear type projection display in which light is projected from the side opposite to the side from which the light projecting surface is observed.

As can be understood from the foregoing description, according to the projection display device of the present invention, the projection lens is disposed such that its optical axis occupies a location parallel to the optical axis of the light source by moving the projector lens' optical axis a certain distance from and in a direction perpendicular to the optical axis of the light source. The condenser lens is positioned at a location reached by moving it in substantially the same direction that the projection lens is moved with respect to the optical axis of the light source. Therefore, light can obliquely illuminate a light valve, and a greater amount of light enters the projection lens. As a result, a bright projection image with high contrast can be produced.

What is claimed is:

1. A projector, comprising:
   a light source;
   a light valve that modulates light beams from the light source;

a uniform illumination optical system that separates the light beams emitted from the light source into a plurality of partial light beams and superimposes the separated light beams on the light valve through a superimposing lens;

a projection lens that enlarges and projects the light beams modulated by the light valve, said projection lens disposed such that an optical axis of said projection lens occupies a location parallel to a center axis of the superimposing lens reached by moving said optical axis of said projection lens by a predetermined distance in a direction perpendicular to the optical axis of the light source; and a condenser lens disposed at a light incident surface side of said light valve, said condenser lens disposed such that an optical axis of said condenser lens occupies a location parallel to the center axis of the superimposing lens reached by moving said optical axis of said condenser lens in substantially the same direction that said optical axis of said projection lens is moved with respect to the center axis of the superimposing lens, wherein the light source, the uniform illumination optical system, the condenser lens, and the projection lens are arranged such that the light beam traveling from the condenser lens towards the liquid crystal light valve is inclined by a predetermined angle from the center axis of the superimposing lens.

2. The projector according to claim 1, wherein a center optical axis of the light from said condenser lens passes approximately through the center of an entrance pupil of said projection lens.

3. The projector according to claim 1, further comprising:
a uniform illumination optical system, disposed in a light path between the light source and said condenser lens, that separates the light beams from the light source into a plurality of partial light beams and causing the separated light beams to be superimposed upon said light valve.

4. The projector according to claim 1, wherein a direction of extension of the center optical axis of the light from said condenser lens substantially matches a direction of light passing through said light valve.

5. The projector according to claim 1, wherein said light valve includes a plurality of pixels disposed in a matrix arrangement, and a microlens array having a plurality of microlenses for gathering light incident upon said pixels, with the centers of said pixels occupying locations reached by moving the centers of said pixels with respect to optical axes of said microlenses in substantially the same direction that said optical axis of said condenser lens is moved with respect to the optical axis of the light source.

6. The projector according to claim 1, further comprising:
a color separator that separates the light beams from the light source into light beams of a plurality of different colors; and
a color combiner that combines the light beams of the plurality of different colors modulated by said light valves corresponding thereto.

7. The projector according to claim 6, wherein a plurality of said light valves are provided for modulating the light beams of the plurality of different colors obtained by said color separator.

8. The projector according to claim 7, wherein said projection lens enlarges and projects the light beams combined by said color combiner.

9. The projector according to claim 8, wherein said condenser lens is disposed at the light incident surface side of each of said light valves.

10. The projector according to claim 9, wherein the optical distances from each of said condenser lenses to said projection lens are substantially equal.

11. The projector according to claim 1, further comprising:
a color separator that separates the light beams from the light source into light beams of three different colors; and
a color combiner that combines the light beams of three different colors modulated by said light valves corresponding thereto.

12. The projector according to claim 11, wherein three of said light valves are provided for modulating the light beams of three different colors obtained by said color separator.

13. The projector according to claim 12, wherein said projection lens enlarges and projects the light beams combined by said color combiner onto a projecting surface.

14. The projector according to claim 13, wherein said condenser lens is disposed at the light incident surface side of each of said light valves.

15. The projector according to claim 14, wherein said color separator includes two dichroic mirrors.

16. The projector according to claim 15, wherein said color combiner includes a dichroic prism having a dichroic layer which is X-shaped and formed along a face where four right angled prism portions are affixed together.

17. The projector according to claim 16, wherein the optical distances from said condenser lenses to said projection lens are substantially equal.

18. A method of forming a projector, the projector having a light source, a light valve that modulates light beams from the light source, a uniform illumination optical system that separates the light beams emitted from the light source into a plurality of partial light beams and superimposes the separated light beams on the light valve, a projection lens that enlarges and projects the light beams modulated by the light valve onto a projecting screen through a superimposing lens, and a condenser lens disposed at a light incident surface side of said light valve, the method comprising:

disposing said projection lens such that an optical axis of said projection lens occupies a location parallel to a center axis of the superimposing lens reached by moving said optical axis of said projection lens by a predetermined distance in a direction perpendicular to the center axis of the superimposing lens;

disposing said condenser lens such that an optical axis of said condenser lens occupies a location parallel to the optical axis of the light source reached by moving said optical axis of said condenser lens in substantially the same direction that said optical axis of said projection lens is moved with respect to the center axis of the superimposing lens; and arranging the light source, the uniform illumination optical system, the condenser lens, and the projection lens such that the light beam traveling from the condenser lens towards the liquid crystal light valve is inclined by a predetermined angle from the center axis of the superimposing lens.

19. The method of forming a projector according to claim 18, wherein a center optical axis of the light from said condenser lens passes approximately through the center of an entrance pupil of said projection lens.

20. The method of forming a projector according to claim 18, further comprising:
disposing a uniform illumination optical system in a light path between the light source and said condenser lens, that separates the light beams from the light source into a plurality of partial light beams and causing the separated light beams to be superimposed upon said light valve.

21. The method of forming a projector according to claim 18, wherein a direction of extension of the center optical axis of the light from said condenser lens substantially matches a direction of light passing through said light valve.

22. The method of forming a projector according to claim 18, wherein said light valve includes a plurality of pixels disposed in a matrix arrangement, and a microlens array having a plurality of microlenses for gathering light incident upon said pixels, with the centers of said pixels occupying locations reached by moving the centers of said pixels with respect to optical axes of said microlenses in substantially the same direction that said optical axis of said condenser lens is moved with respect to the optical axis of the light source.

23. The method of forming a projector according to claim 18, further comprising:

separating the light beams from the light source into light beams of a plurality of different colors; and combining the light beams of the plurality of different colors modulated by said light valves corresponding thereto, wherein a plurality of said light valves are provided for modulating the light beams of the plurality of different colors obtained in the separating step, wherein said projection lens enlarges and projects the light beams combined in the combining step onto a projection surface, wherein said condenser lens is disposed at the light incident surface side of each of said light valves, wherein the optical distances from each of said condenser lenses to said projection lens are substantially equal.

24. The method of forming a projector according to claim 18, further comprising:

separating the light beams from the light source into light beams of three different colors; and combining the light beams of three different colors modulated by said light valves corresponding thereto, wherein three of said light valves are provided for modulating the light beams of three different colors obtained in the separating step, wherein said projection lens enlarges and projects the light beams combined in the combining step onto a projecting surface, wherein said condenser lens is disposed at the light incident surface side of each of said light valves.

25. The method of forming a projector according to claim 24, wherein the separating step in performed by a color separator includes two dichroic mirrors, and the combing step is performed by a color combiner includes a dichroic prism having a dichroic layer which is X-shaped and formed along a face where four right angled prism portions are affixed together, wherein the optical distances from said condenser lenses to said projection lens are substantially equal.

* * * * *